United States Patent
West et al.

(10) Patent No.: US 10,979,152 B1
(45) Date of Patent: Apr. 13, 2021

(54) CONFORMAL ESA CALIBRATION

(71) Applicant: Rockwell Collins, Inc., Cedar Rapids, IA (US)

(72) Inventors: James B. West, Cedar Rapids, IA (US); Connor C. McBryde, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/810,453

(22) Filed: Mar. 5, 2020

(51) Int. Cl.
- H04B 17/00 (2015.01)
- H04B 17/12 (2015.01)
- H04B 17/21 (2015.01)

(52) U.S. Cl.
CPC ............ H04B 17/12 (2015.01); H04B 17/21 (2015.01)

(58) Field of Classification Search
CPC ................................ H04B 17/12; H04B 17/21
USPC ...................................................... 455/67.12
See application file for complete search history.

(56) References Cited

U.S. PATENT DOCUMENTS

| | | | | |
|---|---|---|---|---|
| 5,404,376 A * | 4/1995 | Dent | ................... | H04W 64/00 375/138 |
| 6,636,173 B2 * | 10/2003 | Graham | ................... | G01R 29/10 342/174 |
| 6,744,411 B1 * | 6/2004 | Osterhues | ................... | H01Q 3/34 343/754 |
| 7,068,218 B2 * | 6/2006 | Gottl | ................... | H01Q 1/246 342/368 |
| 7,081,851 B1 * | 7/2006 | Lewis | ................... | H01Q 21/0087 342/372 |
| 7,468,690 B2 * | 12/2008 | Green | ................... | G01S 7/4017 342/174 |
| 9,705,611 B1 * | 7/2017 | West | ................... | H04B 17/21 |
| 9,712,230 B1 * | 7/2017 | Stevens | ................... | H04B 7/26 |
| 9,831,906 B1 * | 11/2017 | Xie | ................... | H03F 3/211 |
| 10,103,431 B2 * | 10/2018 | Swirhun | ................... | H01Q 3/36 |
| 10,283,876 B1 * | 5/2019 | Livadaru | ................... | H01Q 15/0086 |
| 10,374,730 B2 * | 8/2019 | Rainish | ................... | H04B 17/12 |
| 10,707,577 B1 * | 7/2020 | Matland | ................... | H04B 7/0617 |
| 2005/0040874 A1 * | 2/2005 | Allison | ................... | H01P 1/127 327/231 |

(Continued)

FOREIGN PATENT DOCUMENTS

| | | |
|---|---|---|
| EP | 1126544 B1 | 4/2007 |
| EP | 1438768 B1 | 11/2009 |
| EP | 2243193 B1 | 5/2018 |

OTHER PUBLICATIONS

Silverstein, Seth D., "Application of Orthogonal Codes to the Calibration of Active Phased Array Antenna for Communication Satellites", IEEE Transactions on Signal Processing, vol. 45, No. 1, 1997.

*Primary Examiner* — April G Gonzales
(74) *Attorney, Agent, or Firm* — Suiter Swantz pc llo

(57) ABSTRACT

A system for calibrating conformal ESAs includes a rotating platform (positioner) or multiple test probes, or both. Measurements are taken with different radiating elements at different azimuthal angles to the test probes and compared to a known profile to compute correction coefficients for angel and gain for each radiating element. Each radiating element is operated at full power and across a wide frequency spectrum to acquire measurements including coupling and allow calibration to be based on group delay over the frequency spectrum rather than phase delay.

15 Claims, 8 Drawing Sheets

(56) References Cited

U.S. PATENT DOCUMENTS

| | | | | |
|---|---|---|---|---|
| 2011/0006949 A1* | 1/2011 | Webb | ............... | H01Q 3/267 |
| | | | | 342/372 |
| 2017/0187109 A1* | 6/2017 | Wang | ............... | H01Q 3/36 |
| 2019/0235003 A1* | 8/2019 | Paulsen | ............... | G01R 29/10 |
| 2020/0025877 A1* | 1/2020 | Sarkis | ............... | G01S 13/87 |

* cited by examiner

CONFORMAL ESA CALIBRATION

BACKGROUND

Precise group delay performance is critical to electronically scanned array antennas (ESAs). ESA group delay performance varies as a function of aperture shape (e.g., planar or conformal), scan, polarization, and frequency, both in the transmit (Tx) and receive (Rx) modes. Conformal (non-planar) apertures create variable baseline group delay between the aperture surface and a given target's spatial location. Hardware implementation and variability of ESA subcomponents create performance inconsistencies, severely degrading group delay performance, e.g.

Mutual coupling/scan impedance changes as a function of scan angle, with impedance mismatch to RF integrated circuit (RFIC) components. Conversely, non-ideal RFIC impedance worsens the effect.

Conformal ESA calibration is traditionally a difficult process, requiring specialized near-field or far-field ranges to sample the fields radiated from, or received by, the ESA under test. These ranges can become prohibitively expensive, require extensive design and analysis, and sophisticated mechanical alignment systems to ensure test and measurement accuracy.

Group delay calibration is particularly challenging using conventional ESA techniques. Nearfield range calibration is expensive, requiring a large footprint; and nontraditional antenna measurements such as EVM, linearity, spurious/harmonics, etc. are difficult. Far Field calibration often requires a large anechoic chamber, and is slow and expensive, even for a compact far field range.

SUMMARY

In one aspect, embodiments of the inventive concepts disclosed herein are directed to a system for calibrating conformal ESAs. The system may include a rotating platform (positioner) or multiple test probes, or both. Measurements are taken with different radiating elements at different azimuthal angles to the test probes and compared to a known profile to compute correction coefficients for angel and gain for each radiating element.

In a further aspect, each radiating element is operated at full power and across a wide frequency spectrum to acquire measurements including coupling and allow calibration to be based on group delay over the frequency spectrum rather than phase delay.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
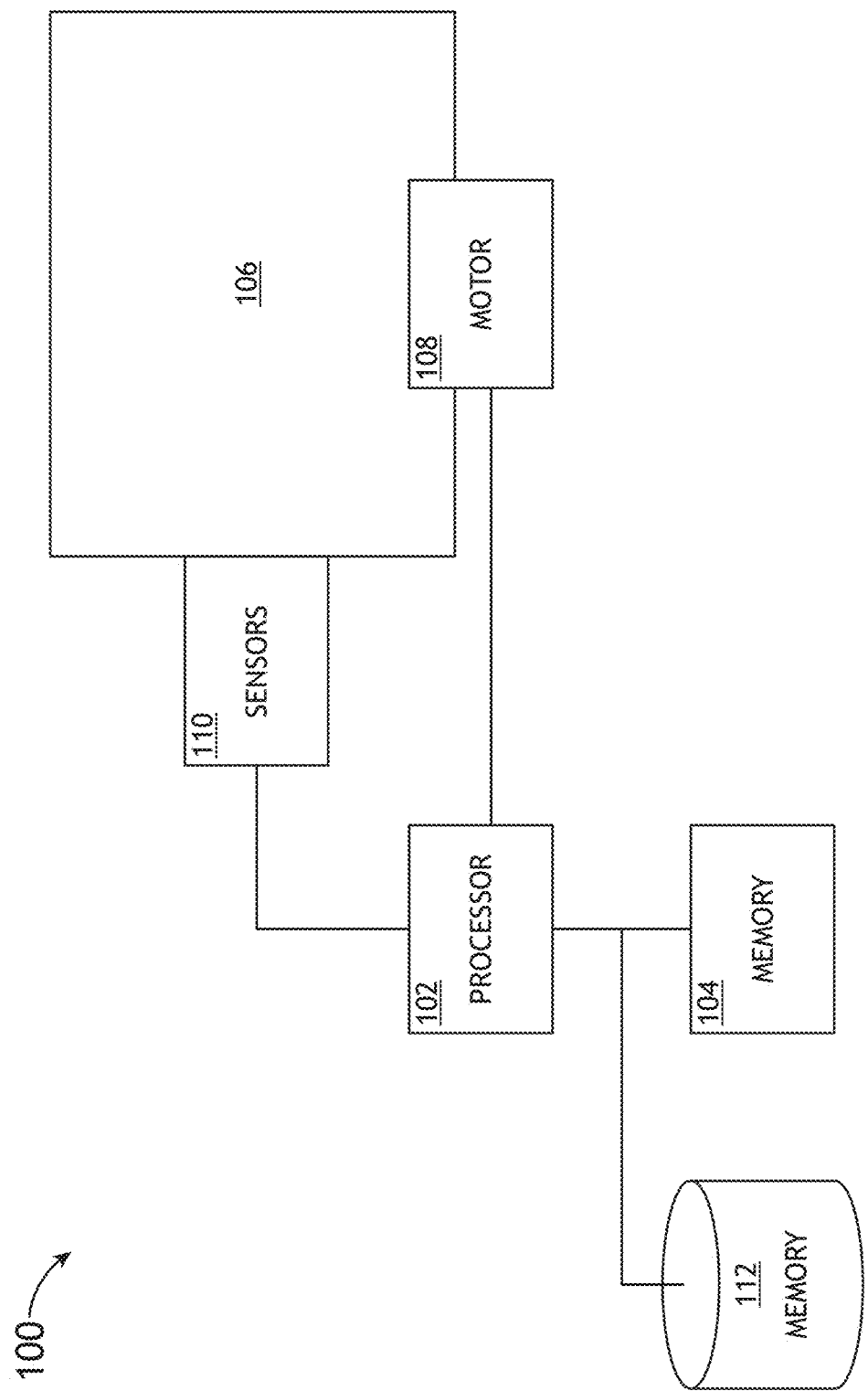
FIG. 1 shows a block diagram of a system useful for implementing exemplary embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for calibrating conformal ESAs. The system may include a rotating platform (positioner) or multiple test probes, or both. Measurements are taken with different radiating elements at different azimuthal angles to the test probes and compared to a known profile to compute correction coefficients for angel and gain for each radiating element.

Referring to FIG. 1, a block diagram of a system 100 useful for implementing exemplary embodiments of the present disclosure is shown. The system 100 includes a processor 102 and memory 104 storing processor executable code for configuring the processor 102 to apply signals to an ESA in an anechoic box 106.

In at least one embodiment, the processor 102 also applies signals to a motor 108 or other actuator to rotate the ESA such that radiating elements of the ESA are successively brought orthogonal to one or more sensors 110. Alternatively, or in a addition, a plurality of sensors 110 or sensor packages may be disposed around the anechoic box 106 to directly receive signals from different radiating elements of the conformal ESA at one time. Such embodiment, may or may not include a motor 108 or actuator to rotate the ESA.

The sensors 110 are in data communication with the processor 102; in at least one embodiment, multiple sensors 210 are coherent with each other such that data points may be correlated in time and potentially in orientation to the ESA where the ESA is rotating. The processor 102 compares the signals received from the one or more sensors 110 to known, desirable data from a storage device 112. The know, desirable data may comprise data derived from a known, calibrated conformal ESA ("golden standard sample"). Alternatively, the known, desirable data may comprise mathematically simulated data.

Based on the comparison, the processor 102 determines one or more correction factors for each elements of the conformal ESA, including a power correction and a phase correction.

Figure 2:
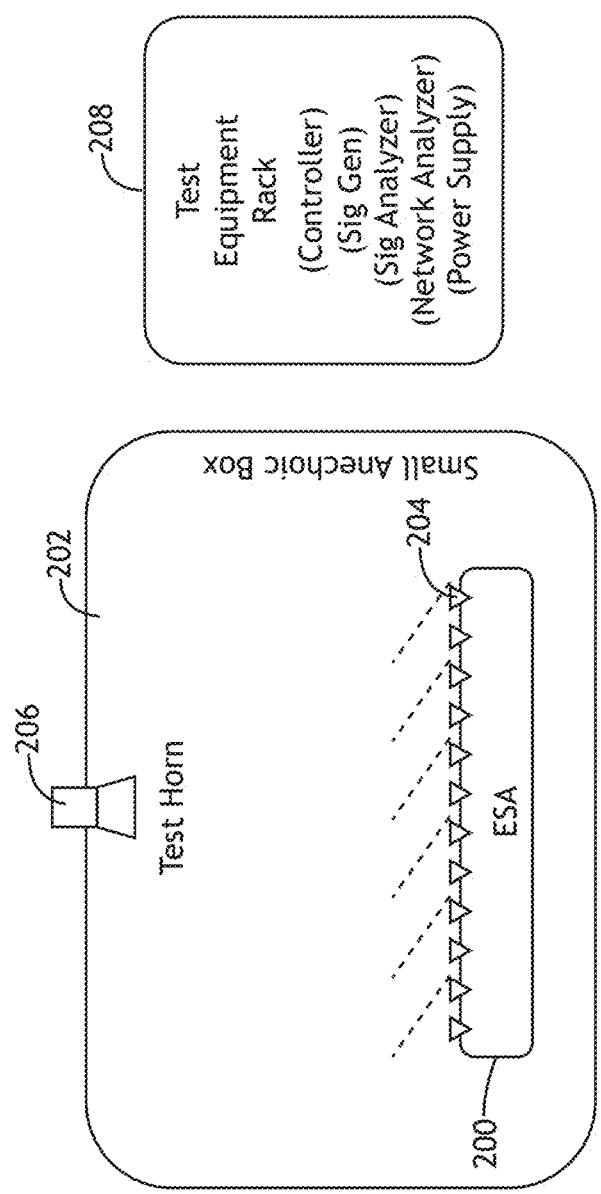
FIG. 2 shows a block diagram of a system for calibrating an ESA.

Referring to FIG. 2, a block diagram of a system for calibrating an ESA is shown. When calibrating an ESA 200 in an anechoic box 202, each radiating element 204 is driven a defined calibration sequence, generally within a narrow frequency range. Signals are collected by a test probe 206 disposed in the anechoic box 202 and delivered to test equipment 208. The test equipment 208 may include a signal analyzer and network analyzer. A controller processes collected signal data from the network analyzer to yield ESA calibration coefficients specific to the ESA 200.

Phase coding utilizes waveform orthogonality between the radiating elements 204 and the test probe 206 based on the Hadamard linear algebra theory. The orthogonality properties of the Hadamard sequence essentially de-correlates the radiating elements 204 such that they operate as a collection of distinct, uncorrelated and independent RF channels. The application of Hadamard orthogonal coding and linear algebra may be better understood with reference to Seth D. Silverstein *Application of Orthogonal Codes to the Calibration of Active Phased Array Antenna for Communication Satellites* (IEEE Transactions on Signal Processing, Vol. 45, No. 1, 1997), which is hereby incorporated by reference. Each radiating element 204, RF channel operates in a far field radiation mode, in an uncorrelated aggregate fashion, while being simultaneously transmitted or received. The test probe 206 receives or transmits the uncorrelated radiating element 204, RF channel signals.

Since the modulation sequence is known a priori, the individual channels are parsed out of the aggregate received or transmitted signal. The mean path length and horn antenna radiation patterns are mathematically removed from the data set to reveal the amplitude and phase shift of each RF channel. In at least one embodiment, Hadamard matrices may be used to measure individual radiating element 204 gain and phase response.

Figure 3:
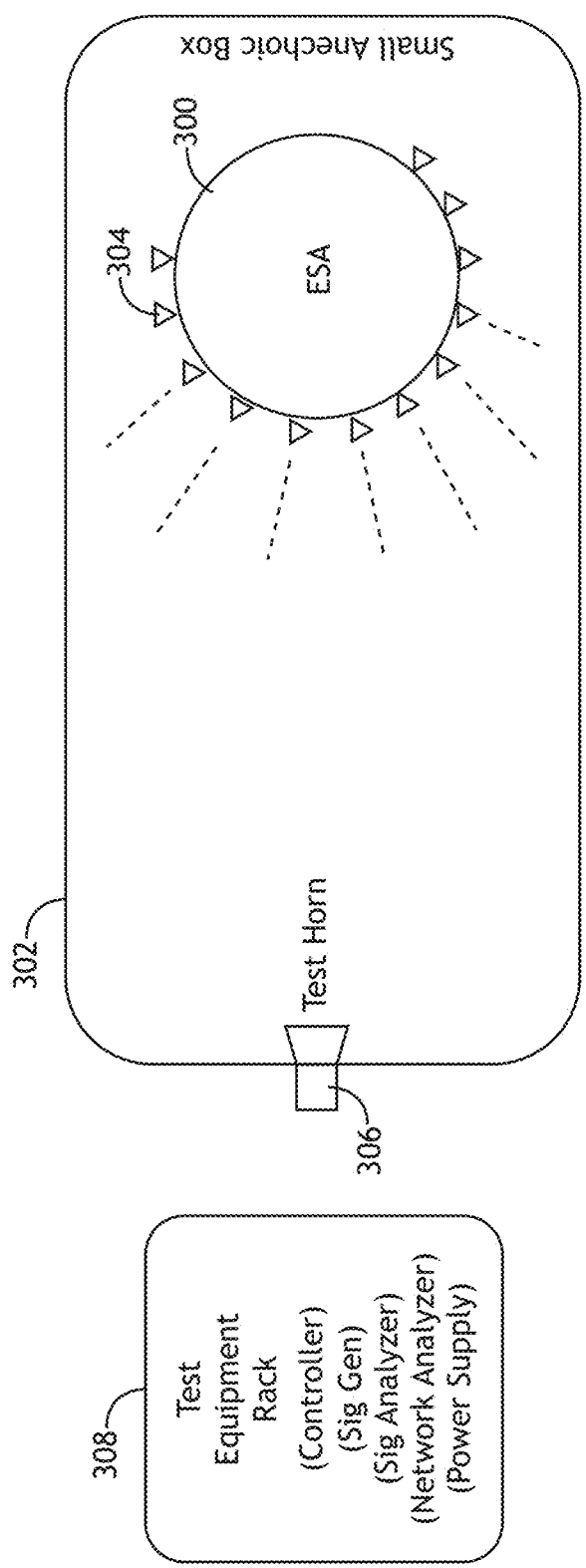
FIG. 3 shows a block diagram of an exemplary embodiment of a system for calibrating a conformal ESA.

Referring to FIG. 3, a block diagram of an exemplary embodiment of a system for calibrating a conformal ESA 300 is shown. In at least one embodiment, a conformal ESA 300 is disposed in an anechoic box 302, on a rotating platform (obscured) configured to rotate the conformal ESA 300 to bring each radiating element 304 into an orthogonal orientation to a test probe 306. The test probe 306 successively transmits or receives signals from each radiating element 304 as the conformal ESA 300 rotates. Alternatively, or in addition, multiple test probes 306 may be disposed at various locations around the anechoic box 302 to transmit or receive signals from the radiating elements 304 at various angle at the same time; for example, where a conformal antenna is disposed in an immobile platform (such as on a leading edge of a wing), an anechoic box 302 with multiple test probes 306 may be placed around the conformal antenna in situ.

Phase coding is performed on the ESA 304 to retrieve coupling coefficients between each radiating element 304 and the one or more test probes 306. Coupling depends strongly on the angle between each radiating element 304 and corresponding test probe 306.

In at least one embodiment, where the ESA 300 is mounted on a rotating platform, phase coding is applied across multiple azimuthal angles and the ESA 300 rotates. It may be appreciated that such rotation may be continuous or discrete to place a column of radiating elements 304 orthogonal to a test probe 306 for a period of time.

In at least one embodiment, where multiple test probes 306 are disposed circumferentially about the ESA 300, the test probes 306 may be commuted via RF switches or measurement data can be taken simultaneously from each test probe 306.

In at least one embodiment, all of the radiating elements 304 are active in a calibration sequence, either on or off, from zero to one hundred eighty degrees. The radiating elements 304 may be isolated such that each radiating element response may be measured with all of the other radiating elements 304 active such that the effect of mutual coupling is accounted for.

In at least one embodiment, for an ultra-broadband array, radiating elements are driven over a wide continuum of frequencies, a rotating platform and multiple test probes may allow for high speed acquisition during data dense calibration. In at least one embodiment, multiple test probes are useful for doubly curved conformal surfaces.

In at least one embodiment, for an ultra-broadband array, radiating elements 304 are driven over a wide continuum of frequencies, a rotating platform and multiple test probes 306 may allow for high speed acquisition during data dense calibration. In at least one embodiment, multiple test probes 306 are useful for doubly curved conformal ESA surfaces.

Figure 4A:
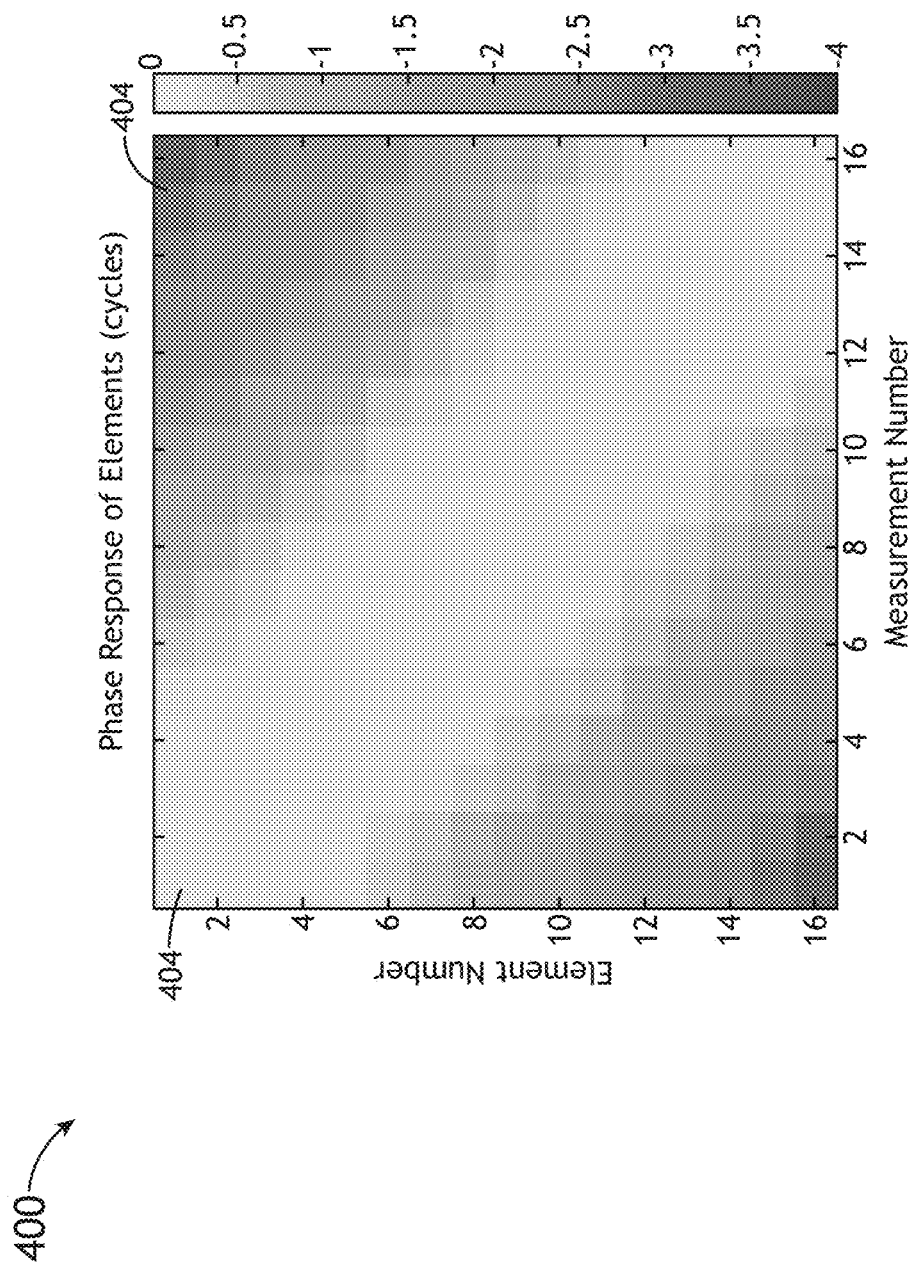
FIG. 4A shows a diagram of phase response outputs of a conformal ESA calibration.
Figure 4B:
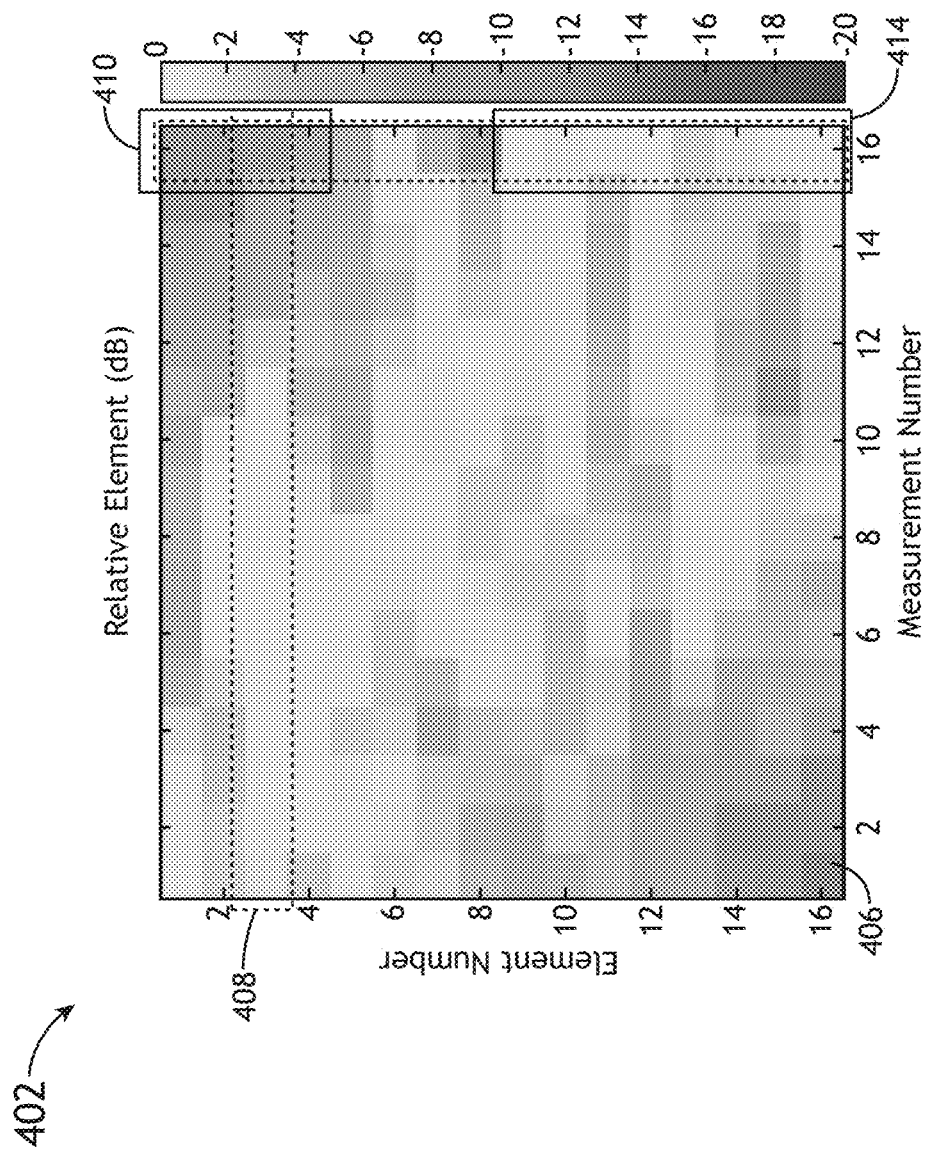
FIG. 4B shows a diagram of a radiating element gain of a conformal ESA calibration.

Referring to FIGS. 4A-4B, diagrams of phase response outputs 400 and radiating element gain 402 of a conformal ESA calibration are shown. Phase coding is applied to a conformal ESA under multiple different physical configurations. In at least one embodiment, where the conformal ESA rotates, each measurement set in the phase coding process, as represented by the phase response outputs 400 and radiating element gain 402, is performed with the conformal ESA at different azimuthal angles in relation to the test probe. This results in each azimuthal measurement set containing a different set of element weights 404, 406. Each measurement set is used to derive a correction coefficient to correct for probe propagation and radiating pattern differences as defined by amplitude and phase/group delay variation. Such coefficients are a function of azimuthal angle based on the known geometry and orientation of the conformal ESA. In at least one embodiment, phase based measurements over a frequency range may be made with group delay determined as a partial derivative of phase with respect to frequency.

In the representations of phase response output 400 and radiating element gain 402 shown, it may be appreciated that for some measurements, sets of radiating elements 410 may be at an azimuthal angle to the test probe such as to have a lower relative weight as compared to other element weights. In at least one embodiment, the calibration process is equivalent to sampling an entire row 408 of the conformal ESA response before advancing to the next element number. A much finer sample grid may be quickly obtained if the positioner is on the inner loop.

In at least one embodiment, modification of inner-outer loop configuration for measurements involves measuring each phase/time delay encoding state across the full range of azimuth rotation (e.g. 0-360° for a circular array). Previously, results were obtained from phase coding measurement collection on the inner loop and azimuth positioning on the outer loop. Precise location of phase center requires a fine sample grid along azimuth rotation angles.

During a process to derive individual element weights, each radiating element's complex weight may be derived from any measurement with sufficient coupling to the test probe. For example, measurement number 16 may be insufficient for a first set of radiating elements 412 but ideal for second set of radiating elements 414.

Figure 5:
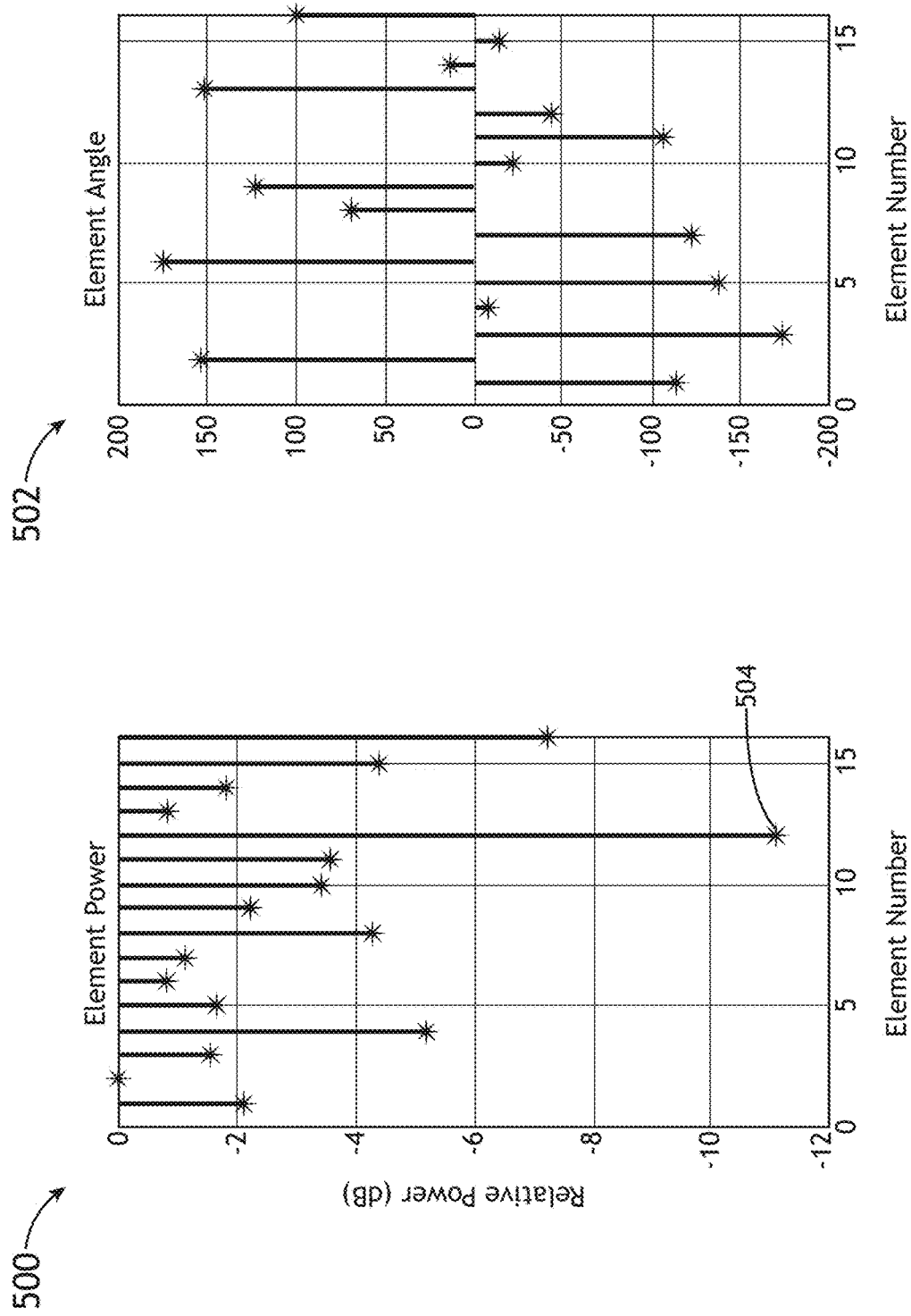
FIG. 5 shows diagrams of element power and angle correction factors for a conformal ESA.

Referring to FIG. 5, diagrams 500, 502 of element power and angle correction factors for a conformal ESA are shown. Based on a comparison of phase response outputs and radiating element gains to known, desirable values (for example, measured values from a "golden standard sample"), correction factors or coefficients may be derived.

In at least one embodiment, the correction factors are via a "best-fit" correction model. Once best-fit probe correction is found, propagation delays are removed from each measurement. The diagrams 500, 502 illustrate normalized element correction coefficients. These coefficients are useful for finding unhealthy, dead radiating elements, such as the twelfth radiating element 504, and correcting phase/delay/gain errors.

In at least one embodiment, where the conformal ESA is mounted on a rotating platform, the best-fit probe correction algorithm can be applied to a measurement set to determine radiating element phase centers as in the angle correction factor diagram 502. These phase centers may migrate as a function of scan/time delay.

Figure 6:
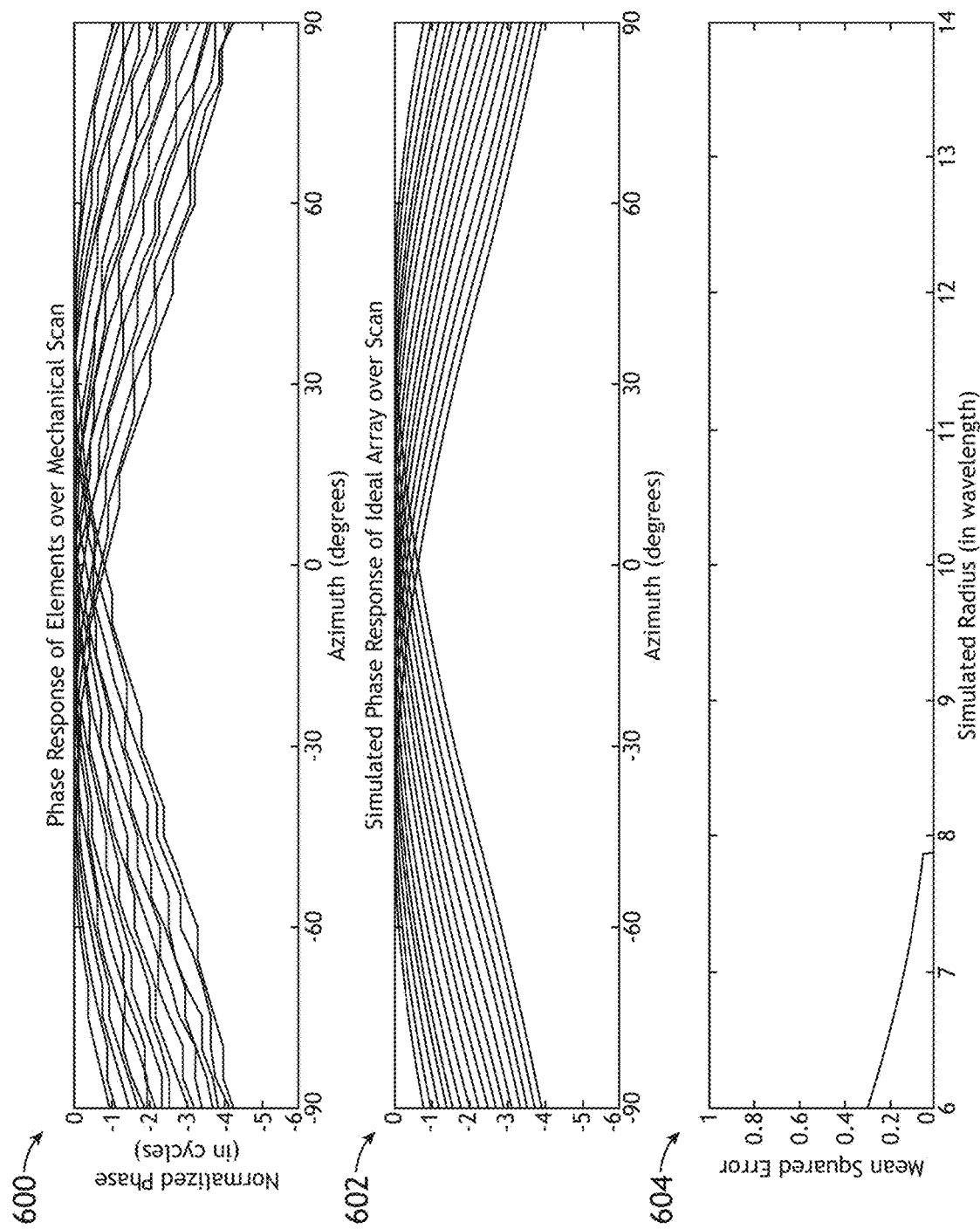
FIG. 6 shows diagrams of simulated and actual phase responses.

Referring to FIG. 6, diagrams 600, 602, 604 of simulated and actual phase responses are shown. Where a best-fit algorithm is applied for probe correction, a conformal phase coding process is used to de-embed probe propagation errors from each measurement. In at least one embodiment, the algorithm compares measured element responses 600 to responses 602 from an ideal or simulated array of varying radius. The process may find the best approximation for the difference in propagation delay between the closest element to the horn, and the furthest (measured) element from the horn. The propagation delay between these two elements is a strong function of the array radius (as illustrated by the comparison 604 of simulated radius to mean square error), and the best-fit propagation delay is used to de-embed future measurements.

Group delay is determined from phase measurements as a function of frequency. Geometric properties of the aperture are thereby used as an advantage for probe correction.

Figure 7:
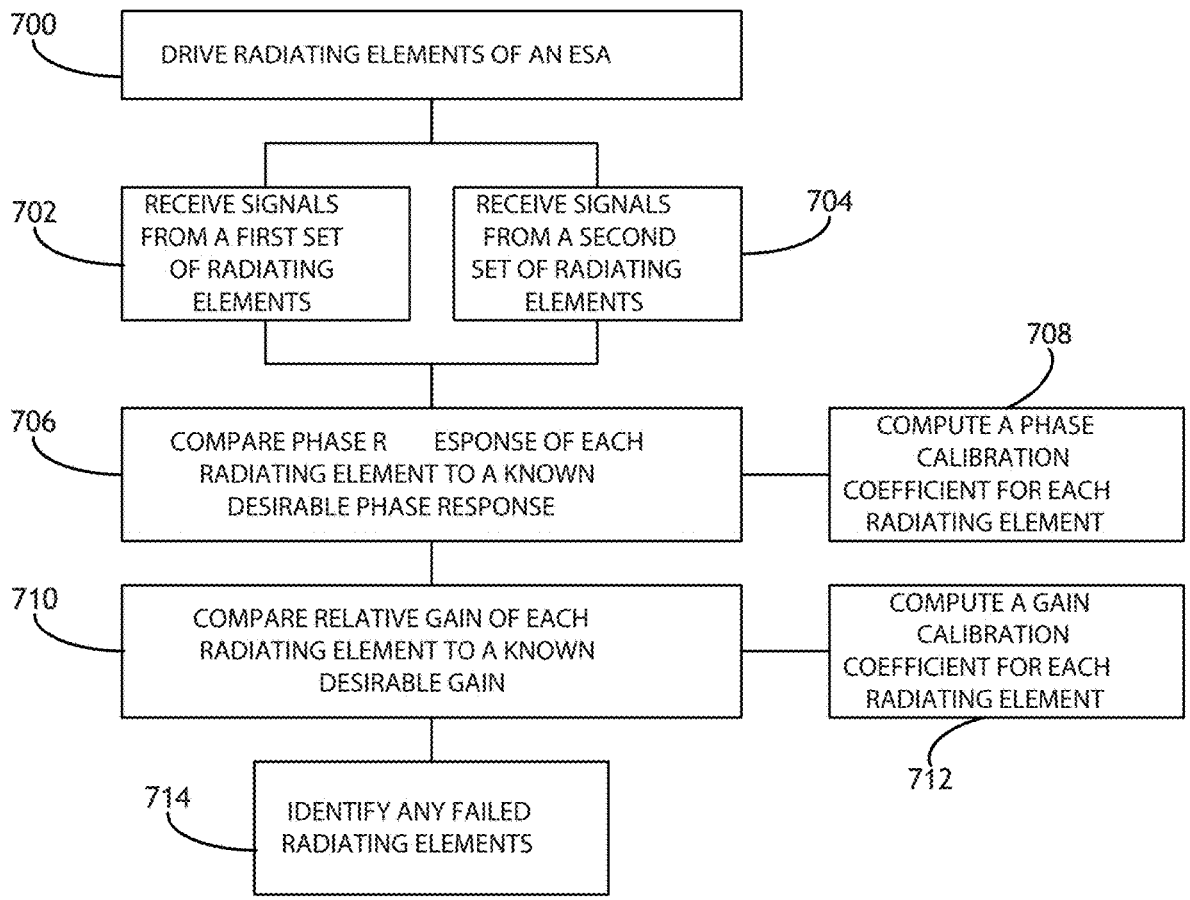
FIG. 7 shows a flowchart of an exemplary embodiment of a method for calibrating a conformal ESA.

Referring to FIG. 7, a flowchart of an exemplary embodiment of a method for calibrating a conformal ESA is shown. A calibrating system drives 700 the radiating elements of an ESA; in at least one embodiment, the radiating elements are all driven in a broad spectrum at a consistent power level. Signals are then received 702, 704 from the radiating elements. In at least one embodiment, signals may be received 702, 704 successively as the ESA rotates. In at least one embodiment, multiple test probes disposed around the ESA in an anechoic box may receive 702, 704 signals at once, but from different sets of radiating elements.

Signals from a first set of radiating elements are received 702 and signals from a second, separate set of radiating elements are received 704 either concurrently or successively via one or more test probes. The phase response from each of those signals are then compared 706 to a known, desirable phase response, for example form a calibrated, golden standard ESA. Based on the phase response comparison 706, phase calibration coefficients are computed 708 for each radiating element. Such computation 708 may be by a best-fit algorithm.

Likewise, the gain (power output) from each of those signals are compared 710 to a known, desirable gain. Based on the gain comparison 710, gain calibration coefficients are computed 712 for each radiating element. Such computation 712 may also be by a best-fit algorithm.

In at least one embodiment, calibration allows the conformal, non-planar ESA to operate in a narrow band. Alternatively, or in addition, arbitrary surface shapes may be calibrated via group delay for ultra-wideband systems; in such embodiment, time delay may be the factor being calibrated for the ultra-wideband array as opposed to phase delay.

In at least one embodiment, group delay performance is determined via partial derivatives of individual measurements over a range of frequencies. Alternatively, or in addition, group delay performance is determined directly from a network analyzer measurement of group delay.

It may be appreciated that each shape of conformal ESA may require specific models and algorithmic steps. In at least one embodiment, the comparisons 706, 710 and computations 708, 712 measure group or time delay as distinct from phase delay. Because the ESA may be operating in a broad frequency spectrum, phase delay may be an inadequate measure for calibrating the ESA.

In at least one embodiment, Failed radiating elements are identified 714 based on phase response comparison 706 and/or the gain comparison 710. Calibration coefficients for surrounding radiating elements may be modified to account for the failed radiating element.

In at least one embodiment, the calibration process may be generalized to multidimensional calibration algorithms as a function of, for example, beam scan/pointing, polarization state, dynamic beam shape control, temperature (in the case of in situ calibration where the anechoic box is adapted to a standard environmental test chamber), etc.

Embodiments of the present disclosure are applicable to arbitrary conformal (3D) ESA configurations. Such calibration process allows high throughput within a production test environment due to the physical compactness of the test suite and the time efficient test algorithm.

It should be appreciated that conformal ESAs may be of various shapes; while cylindrical ESAs are shown, two planar ESAs at different angles from each other, chevron shaped ESAs, diamond shaped ESAs, etc. are all also envisioned. Furthermore, calibration may comprise determining correction coefficients that configure the ESA to present a desired radiating pattern, for example as a large planar array.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method for calibrating electronically scanned array antennas (ESAs) comprising:
   driving all of the radiating elements of a conformal ESA;
   receiving signals from the radiating elements at successively different azimuthal angles to at least one test probe;
   comparing the received signals to a golden sample;
   determining a gain calibration coefficient for one or more radiating elements via Hadamard orthogonal coding; and
   determining a phase calibration coefficient for one or more radiating element via Hadamard orthogonal coding.

2. The method of claim 1; further comprising periodically repositioning the conformal ESA via a rotating repositioner.

3. The method of claim 2; further comprising:
   identifying a first set of radiating elements during a first periodic repositioning, the first set of radiating elements having a gain above a predetermined threshold;
   identifying a second set of radiating elements during the first periodic repositioning, the second set of radiating elements having a gain below a predetermined threshold; and
   determining the gain calibration for the first set of radiating elements, but not the second set of radiating elements, based on signals from the first periodic repositioning.

4. The method of claim 2; wherein the at least one test probe comprises a plurality of test probes disposed periodically around an anechoic chamber; and further comprising receiving signals from each of the test probes during each periodic repositioning, the signals corresponding to each radiating element.

5. The method of claim 1; further comprising identifying one or more faulty radiating elements based on at least one of a gain comparison or an phase comparison.

6. The method of claim 1; wherein driving all the radiating elements comprises driving all of the radiating elements in a wide frequency band.

7. The method of claim 6; further comprising calculating a group delay based on the phase delay of the frequencies in the wide frequency band.

8. The method of claim 1; further comprising:
   placing all of the radiating elements into a receive mode; and
   placing the at least one test probe into a transmit mode.

9. A system for calibrating electronically scanned array antennas (ESAs) comprising:
   an anechoic box;
   at least one test probe;
   a rotating positioner; and
   at least one processor in data communication with the at least one test probe, the rotating positioner, and a memory for embodying processor executable code to configure the at least one processor to:
     drive all of the radiating elements of a conformal ESA;
     periodically reposition the conformal ESA with respect to the at least one test probe; and
     periodically receive signals from the radiating elements at successively different azimuthal angles to the at least one test probe.

10. The system of claim 9; wherein the at least one processor is further configured to:
    compare the received signals to a golden sample;
    determine a gain calibration coefficient for one or more radiating elements via Hadamard orthogonal coding; and
    determine a phase calibration coefficient for one or more radiating element via Hadamard orthogonal coding.

11. The system of claim 9; wherein the at least one processor is further configured to:
    compare the received signals to a golden sample; and
    identify one or more faulty radiating elements based on at least one of a gain comparison or an phase comparison.

12. The system of claim 9; wherein driving all the radiating elements comprises driving all of the radiating elements in a wide frequency band.

13. The system of claim 12; wherein the at least one processor is further configured to calculate a group delay based on partial derivatives of one or more frequencies.

14. The system of claim 9; wherein:
    the at least one test probe comprises a plurality of test probes disposed periodically around the anechoic chamber; and
    the at least one processor is further configured to:
      receive signals from each of the test probes during each periodic repositioning, the signals corresponding to each radiating element.

15. The system of claim 9; wherein the at least one processor is further configured to:
    place all of the radiating elements into a receive mode; and
    place the at least one test probe into a transmit mode.

* * * * *